United States Patent [19]

Morito et al.

[11] Patent Number: 4,852,181
[45] Date of Patent: Jul. 25, 1989

[54] SPEECH RECOGNITION FOR RECOGNIZING THE CATAGORY OF AN INPUT SPEECH PATTERN

[75] Inventors: Makoto Morito; Yukio Tabei; Kozo Yamada, all of Tokyo, Japan

[73] Assignee: Oki Electric Industry Co., Ltd., Tokyo, Japan

[21] Appl. No.: 909,957

[22] Filed: Sep. 22, 1986

[30] Foreign Application Priority Data

| Sep. 26, 1985 | [JP] | Japan | 60-213417 |
| Sep. 26, 1985 | [JP] | Japan | 60-213418 |
| Oct. 11, 1985 | [JP] | Japan | 60-224878 |
| Jan. 6, 1986 | [JP] | Japan | 61-451 |

[51] Int. Cl.$^4$ .............................................. G10L 3/00
[52] U.S. Cl. .......................................... 381/46; 381/43
[58] Field of Search ...................... 381/42, 43, 45, 46, 381/47

[56] References Cited

U.S. PATENT DOCUMENTS

| 4,000,369 | 12/1976 | Paul, Jr. et al. | 381/46 X |
| 4,100,370 | 7/1978 | Suzuki et al. | 381/42 |
| 4,227,046 | 10/1980 | Nakajima et al. | 381/47 |
| 4,467,437 | 8/1984 | Tsuruta et al. | 381/43 X |
| 4,520,500 | 5/1985 | Mizuno et al. | 381/43 |
| 4,558,459 | 12/1985 | Noso et al. | 381/43 |
| 4,630,304 | 12/1986 | Borth et al. | 381/47 X |

OTHER PUBLICATIONS

"Speaker-Independent Work Recognition Using Multiples Similarity Method", Tsuneo Niita et al., 433 Electronics & Communications in Japan 68(1985), Sep., No. 9, Part I, New York, USA, pp. 20-26.
"On Creating Averaging Templates", Y. J. Liu, Nartron Corporation Reed City, Michigan 49677, 1984 IEEE, pp. 9.1.1-9.1.4.
"Experiments in Isolated Word Recognition Using Noisy Speech", G. Neben et al., Lexington, MA, IEEE 1983, pp. 1156-1159.
"Performance of Isolated Word Recognition System for Degraded Speech", B. Yegnanarayana et al., IEEE 1984, pp. 9.9.1-9.9.4.
"Suppression of Acoustic Noise in Speech Using Spectral Subtraction", Steven F. Boll, Member IEEE 1979, pp. 113-120.
"Recognition of Vowels in Japanese Words Using Spectral Local Peaks", Kyung Tae Kim et al., J. Acoust, Soc. Jpn (E)5,4(1984), pp. 253-262.
"Dynamic Programming Algorithm Optimization for Spoken Word Recognition", Hiroaki Sakoe et al., IEEE Transactions on Acoustics, Speech, and Signal Processing, vol. ASSP-26, No. 1, Feb. 1978, pp. 43-49.

Primary Examiner—William M. Shoop, Jr.
Assistant Examiner—Marc S. Hoff
Attorney, Agent, or Firm—Wenderoth, Lind & Ponack

[57] ABSTRACT

Speech recognition method and system are adapted to previously prepare a noise pattern in response to environmental noise prior to inputting a speech signal, evaluate a speech feature vector Bi yielded by subtracting the noise pattern from a feature vector Ai of the input speech upon inputting the speech signal thereafter, spectrum-normalize the speech feature vector Bi, evaluate a local peaks vector by making use of binary-coding processing wherein only a component of a channel being the maximum of the spectrum-normalized vector in a direction of frequency is assumed to be "1", evaluate pattern similarity between an input pattern comprising a local peaks vector from the start point to the end point of the input speech and previously prepared reference patterns of a plurality of categories of the same format as the input pattern, and judge a category of a reference pattern being the maximum among the pattern similaritites as a recognized result.

As a result, any influence of environmental noise on the speech in concern is eliminated for assuring highly accurate recognition.

Furthermore, the speech recognition method and system are adapted to improve efficiency and accuracy of speech recognition by making use of processing of evaluating a new speech feature vector of a prescribed frame number of effecting linear expansion therefor on the basis of internal division of adjoining speech feature vectors Bi and Bi+1, and processing of smoothing a local peaks vector.

4 Claims, 11 Drawing Sheets

Fig. 5
(A) UNDER NOISELESS ENVIRONMENT
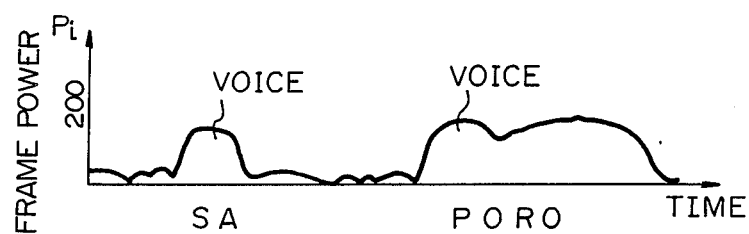
(B) UNDER NOISY ENVIRONMENT
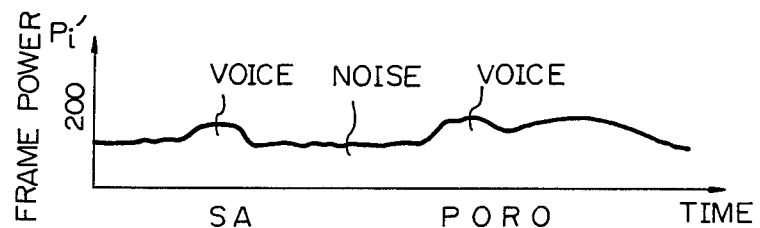

SPEECH RECOGNITION FOR RECOGNIZING THE CATAGORY OF AN INPUT SPEECH PATTERN

BACKGROUND OF THE INVENTION

1. Field of the Invention

The present invention relates to a method and a system for accurately recognizing speech, and more particularly to a speech recognition method and system having excellent recognition accuracy even under noisy environments.

2. Description of the Related Art

Many research efforts as to speech recognition have been made now to improve system functions as well as to effectively enter any signal into various types of information equipment and communication equipment. A method of pattern matching is known in the art as an ordinary method to effect speech recognition.

A prior method of speech recognition will be described below with reference to FIG. 1.

An input speech (S1) signal is converted into a time series pattern (hereinafter referred to as a speech pattern) of vectors indicative of features of the frequency analysis (S2) thereof. The speech pattern is yielded by sampling intra-band frequency components for every time interval T (8 milliseconds, for example, hereinafter referred to as a speech frame), the intra-band frequency component being extracted through a group of P band-pass filters having different center frequencies. In addition, speech power of the speech pattern for each speech frame interval is also evaluated in this frequency analysis (S2). The speech pattern yielded (extracted) through the frequency analysis (S2) is stored in succession in an input memory (S5) during the succeeding speech pattern storage processing (S3). Meanwhile, a voiced interval, i.e., a start point and an end point of speech are determined based on the speech power evaluated through the frequency analysis (S2) in the speech interval detection processing (S4). As an algorithm for determining a voiced interval using the speech power, there is known, for example, a simple algorithm taking as a start point of speech a time point of the speech power at more than a certain threshold and as an end point of the speech a time point of the speech power at less than the threshold. There are known other general algorithms as well. The speech pattern within the voiced interval determined through the speech interval detection processing (S4) is read from the input memory (S5), while a reference pattern is read from a reference pattern memory (S6). Then, in the similarity evaluation processing (S7), the similarity between the speech pattern and the reference pattern is estimated by making use of a dynamic programming matching method and a linear matching method, for example. The reference pattern described here is a time series pattern of vectors subjected to the same speech analysis as in the speech pattern with respect to a word being a recognition object, and is previously stored in the reference pattern memory (S6). In the subsequent judgement processing (S8), the similarity between each reference pattern evaluated by the similarity evaluation processing (S7) is compared, and a name given to a reference pattern indicative of a maximum similarity is determined as a recognition result (S9). The prior speech recognition method described above was adapted to estimate a difference between the speech pattern indicative of a spectrum of the speech signal and the reference pattern previously evaluated by the same spectral analysis using the similarlity described above, and thereby adopt a name of the reference pattern showing the maximum similarity as a recognition result. Accordingly, when input speech and reference patterns are the same word, the similarity therebetween is increased, but when they are different the similarity is reduced. If, however, the spectrum of a speech pattern is distorted due to factors other than the speech, for example external noises, similarity between a speech pattern and a reference pattern is reduced even if both belong to the same category, and hence it is impossible to yield a correct recognition result. Furthermore, such a prior recognition method requires much time for the arithmetic operations and a memory storage, and is thus likely to result in a large-size structure device for implementation.

SUMMARY OF THE INVENTION

In view of the drawbacks of the prior speech recognition techniques, it is an object of the present invention to provide a speech recognition method and a system therefore which is capable of recognizing an input speech with higher accuracy in both a quiet environment as well as in noisy environments.

Another object of the present invention is to provide a speech recognition method and a system therefore which has an increased operation processing speed and is reduced in storage capacity.

To achieve the above objects, a speech recognition method according to the present invention comprises the steps of: (a) subjecting an input speech or ambient noises to a frequency analysis for evaluating feature vectors $A_i$ comprising components of a plurality of channels corresponding to frequency components of the input speech or the ambient noises for each prescribed speech frame period; (b) converting the feature vector $A_i$ of the input speech to a local peaks vector; (c) evaluating the pattern similarity between an input pattern comprising a time series of local peaks vectors from the start point to the end point of the input speech and the reference pattern previously prepared comprising a plurality of categories of the same format as that of the input pattern by making use of nonlinear or linear matching; and (d) judging as a recognition result a category given to a reference pattern having similarity being maximum among the pattern similarities evaluated for each reference pattern; the improvement including the step of converting a local peaks vector comprising the steps of: (A) time-averaging the feature vector $A_i$ in a prescribed noise detection interval in which only noises are found to be existent before any speech is input for previously estimating a noise pattern N; (B) subtracting the noise pattern N so estimated from the feature vector $A_i$ of an input speech evaluated for each the above-described speech frame when the speech is input after preparing the noise pattern for evaluating a speech feature vector $B_i$; (C) evaluating frame power in the speech frame in concern from the speech feature vector $B_i$ and thereby detecting the start point and the end point of the input speech with use of the frame power evaluated as such; (D) evaluating a least square fit line from the speech feature vector for each speech frame, and thereby spectrum-normalizing the speech feature vector with use of the least square fit line, and making equal to logic "1" components corresponding to channels being the maximum of the spectrum normalized speech feature vector while making equal to logic "0" the other components for evaluating the local peaks vector.

The speech recognition method according to the present invention may furthermore include, before the step of evaluating the local peaks vector in the step of converting the local peaks vector, a step of evaluating a new speech feature vector by making use of linear expansion operation by internal division processing with use of a speech feature vector of an arbitrary speech frame and a speech feature vector of the next speech frame with respect to speech feature vectors from a speech frame of the start point of an input speech from that of the end point thereof while setting a speech frame length of a time series of the new speech feature vector to a prescribed one.

Furthermore, the step of evaluating the local peaks vector in the step of converting the local peaks vector may comprise the steps of: (a) spectrum-normalizing the feature vector of an input speech with use of a least square fit line in a speech frame to which the feature vector belongs and thereby extracting a spectrum-normalized feature vector; (b) extracting a window vector comprising each component of a binary variable yielded by converting each component of the spectrum-normalized feature vector to logic "1" if it is positive and to logic "0" if it is logic "0" or negative; (c) smoothing the window vector described above and extracting a smoothed window vector; (d) evaluating a product of each component of the spectrum-normalized feature vector and the each component of the smoothed window vector and extracting the product as a windowed feature vector; and (e) judging whether or not the windowed feature vector has the maximum values in a frequency region and converting the windowed feature vector to a binary local peaks vector where each component of the windowed feature vector corresponding to the maximum value, i.e., a local peak is made "1" while the other component made "0".

In addition, a speech recognition system for implementing the speech recognition method described above comprises:

(a) evaluation means for evaluating a feature vector $A_i$, the evaluation means being composed of a signal processor, for example;

(b) conversion means for converting a feature vector to a local peaks vector;

(c) an input pattern memory for storing an input pattern;

(d) a reference pattern memory for storing a reference pattern;

(e) evaluation means for evaluating pattern similarity; and (f) judgement means.

Hereupon, the above-described local peaks vector conversion means, pattern similarity evaluation means, and judgement means are respectively realized by a processor operatable in conformity with a program stored in a program memory. These means are respectively realizable with exclusive hardware without use of the processor.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5(A) is a view exemplarily illustrating frame power $P_i$ under noiseless environment;

FIG. 5(B) is a view exemplarily illustrating frame power $P_i'$ under noisy environment due to automobiles;

DESCRIPTION OF THE PREFERRED EMBODIMENTS

A first embodiment of the present invention will be described with reference to FIG. 2.

Figure 1:
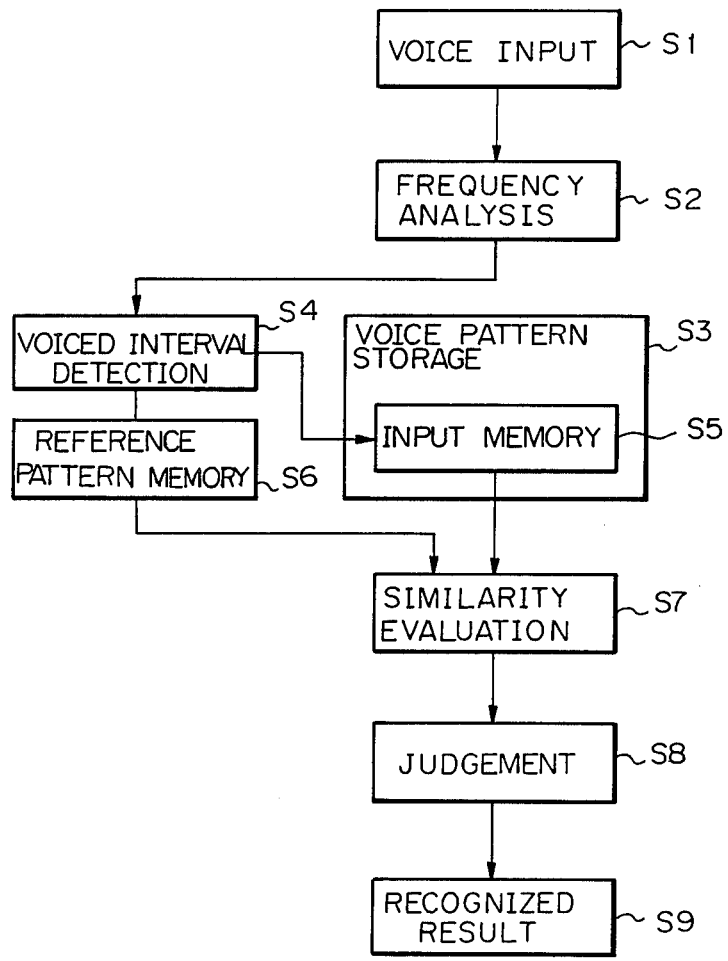
FIG. 1 is a flowchart illustrating processing by a prior speech recognition method.
Figure 2:
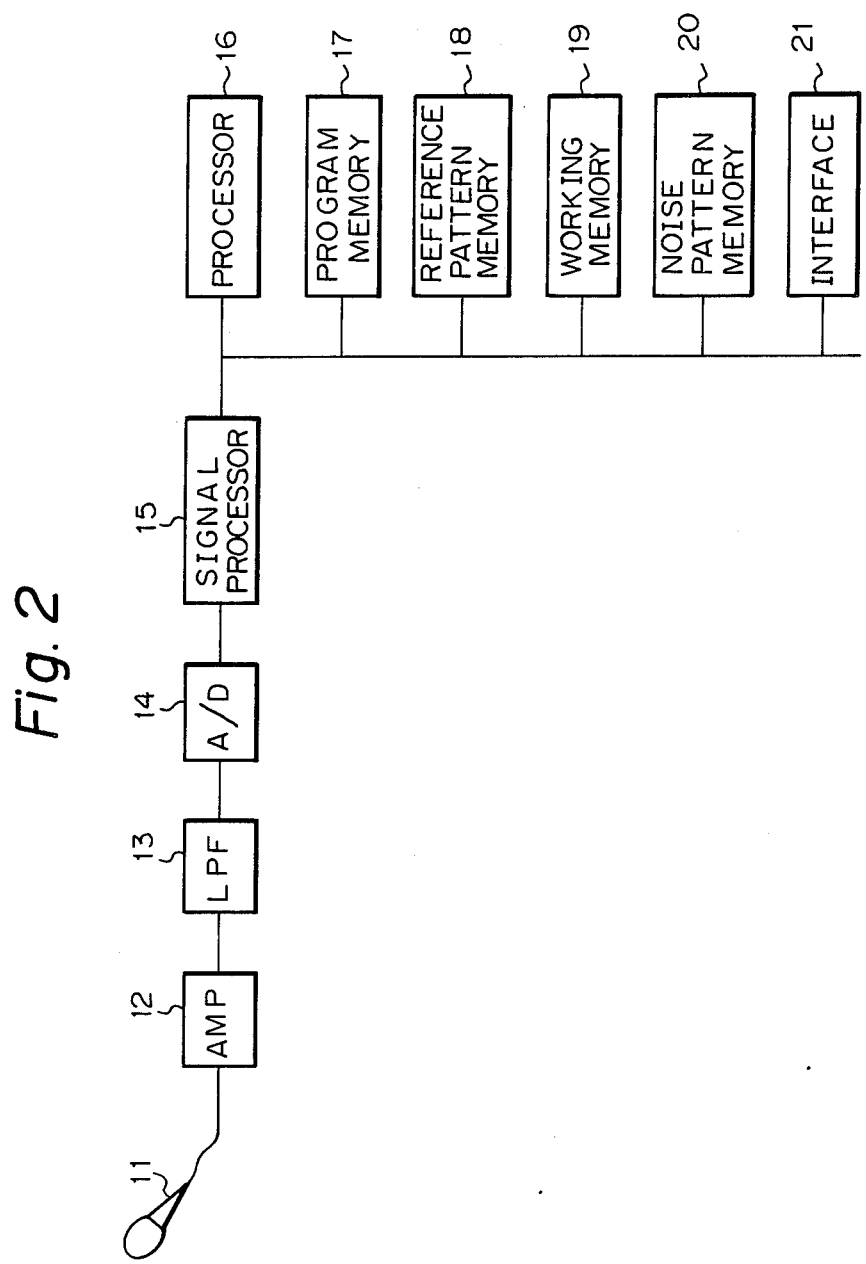
FIG. 2 is a block diagram illustrating a speech recognition apparatus according to the present invention.
Figure 3:
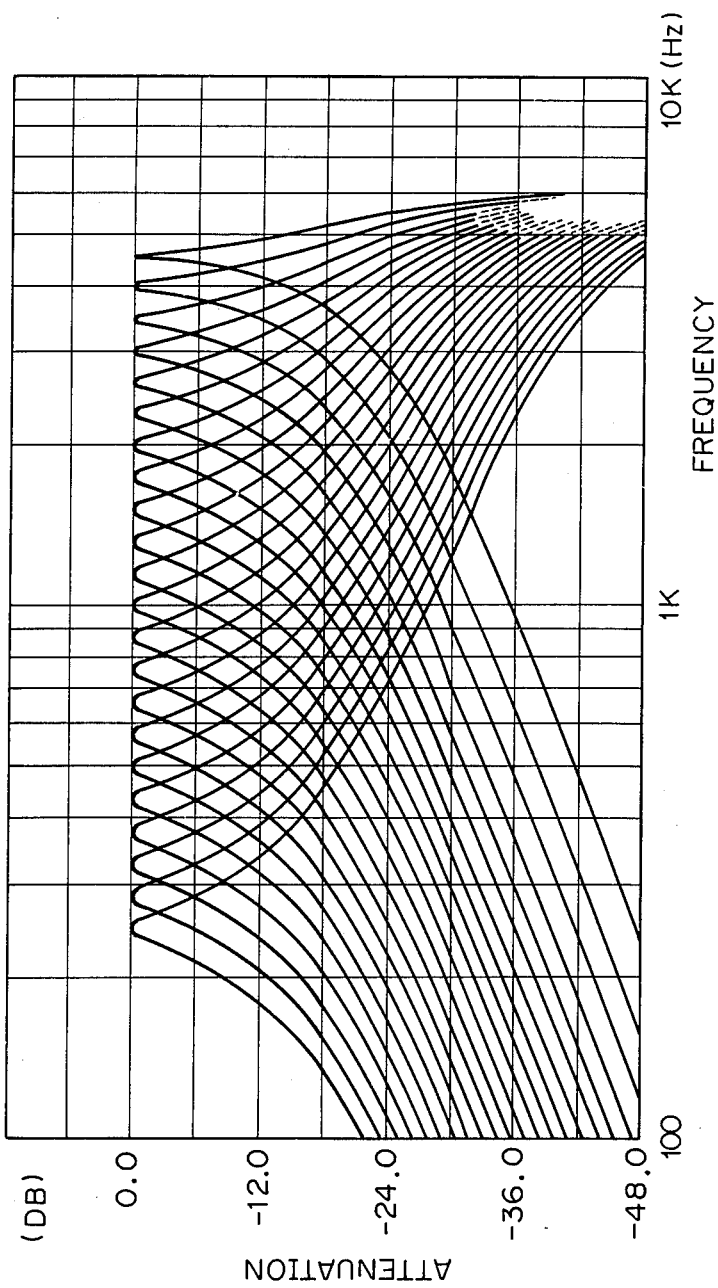
FIG. 3 is a view illustrating a characteristic of a band pass filter of a signal processor 15.

As shown in FIG. 2, illustrating a speech recognition apparatus for embodying a speech recognition method of the present invention, designated at 11 is a microphone, 12 is an amplifier for amplifying a speech signal, 13 is a low-pass filter, 14 is an analog-to-digital (A/D) converter for converting a speech to the digital signal, 15 is a signal processor for evaluating a feature vector, 16 is a processor, 17 is a program memory for storing a program of a processor, 18 is a reference pattern memory for storing a reference pattern therein, 19 is a working memory, 20 is a noise pattern memory for storing a noise pattern, and 21 is an interface for transmitting a recognition result to the outside. An interface circuit is required between any two constituent circuit elements in the strict sense, but description thereof will be omitted.

Operation of the speech recognition apparatus is as follows. An input speech or environmental noises are converted to an analog electric speech signal through the microphone 11. The analog speech signal is amplified by the amplifier (AMP) 12, and thereafter a high frequency component thereof is eliminated by the low-pass filter (LPF) 13. The processing by the low-pass filter 13 is required for sampling in the A/D converter 14 effected thereafter. For this filter, a low-pass filter of a cut-off frequency of 5 KH and of attenuation of 48 dB/oct is employed, for example.

Figure 4:
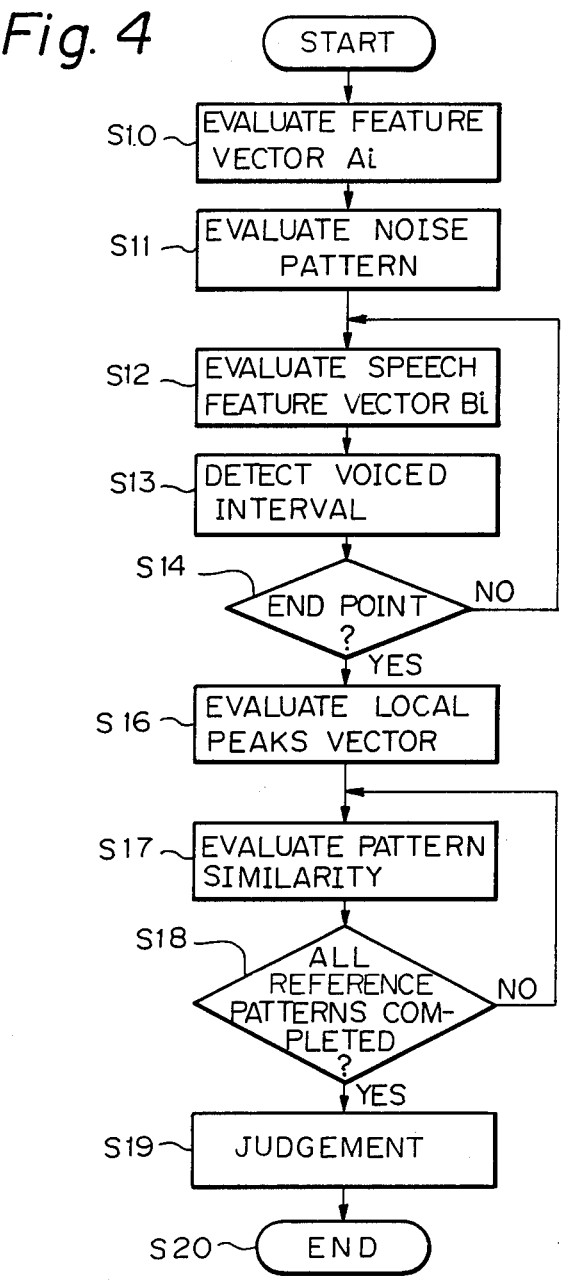
FIG. 4 is a flowchart illustrating processing of the first embodiment and that of a third embodiment of the present invention.

In succession, the analog speech signal, having the high-frequency component thereof removed, is sampled by the A/D converter 14 with a 12 KHz sampling frequency, for example and converted to a 12 bit digital speech signal. FIG. 4 shows a flowchart of each processing thereafter. The signal processor 15 evaluates feature vectors of the input speech or the environmental noises based on the digital speech signal yielded as such. For the signal processor 15, a Texas Instrument 32010, processor for example, can be employed.

The evaluation of the feature vector described above is as follows.

"Evaluation of feature vectors Ai - - - (S10)".

The signal processor 15 also operates as a plurality of band pass filters respectively having different center frequencies. The signal processor 15 a effects band pass type digital filter operation for the digital speech signal transmitted from the A/D converter 14 and extracts frequency components of a plurality of channels (The number of the channels are assumed here to be K.).

To estimate the magnitude of this frequency component, an operation for yielding an absolute value thereof is effected together with an averaging operation. The averaging operation is performed for each channel assuming for example an 128 sampling periods as one speech frame. In such a manner, a feature vector component $Ai^k$ corresponding to each channel k (k=1, 2, ..., K) of an ith speech frame is evaluated. Using the feature vector component $Ai^k$ corresponding to each channel so evaluated in succession, a feature vector Ai in the ith speech frame is expressed as described below.

$$Ai = (ai^1, ai^2, ai^3, \ldots, ai^k, \ldots, ai^K)$$

The feature vector component $Ai^k$ (k=1, 2, ..., K) of the feature vector Ai for each speech frame (i) so evaluated is transmitted from the signal processor 15 to the processor 16 in time division. The processor 16 executes the following respective processings in conformity with a program stored in the program memory 17 for a train of feature vectors of an input speech comprising the feature vector Ai of each speech frame available from the signal processor 15:

1. evaluation of a noise pattern (S11)
2. evaluation of speech feature vectors Bi (S12)
3. detection of a voiced interval (S13)
4. evaluation of local peaks vectors (S16)
5. evaluation of pattern similarity (S17)
6. decision processing (S19)

"Evaluation of a noise pattern - - - S11"

The evaluation of a noise pattern is properly effected prior to inputting any speech signal, but a suitable specific noise detection interval is actually provided and the noise pattern is measured in that interval because it is likely that sound will be uttered during the measurement.

Namely, a time interval in which only environmental noises are input without any input of speech is set corresponding to successive 10 speech frames, for example. This is called a noise detection interval. In the noise detection interval, a speaker utters no sound. Thus, only environmental noises are input into the microphone 11 and transmitted to the signal processor 15 through the low-pass filter and the A/D converter, and resulting feature vectors from the signal processor 15 are successively stored in the working memory 19. The feature vectors available in the noise interval as described above provide a noise spectrum, which are called noise vectors in particular and expressed as Nl. Here, a subscript l represents a speech frame and satisfies l=1, 2, ..., 10. In addition, $$N_l = \{n_l^1, n_l^2, n_l^3, \ldots, n_l^k, \ldots, n_l^K\}$$

where $n_l^1, n_l^2, \ldots, n_l^K$ are respectively each component of the noise vector $N_l$. The noise vectors $N_l$ corresponding to ten speech frames are stored in the working memory 19, and thereafter an averaged noise vector N comprising an average value of all of the noise vectors $N_l$ (l=1, 2, ..., 10) for each channel is evaluated and stored in the noise pattern memory 20. Here, $N = (n^1, n^2, \ldots, n^K)$, but $$n^1 = \frac{1}{10} \sum_{l=1}^{10} n_l^1, n^2 = \frac{1}{10} \sum_{l=1}^{10} n_l^2, \ldots, n^k = \frac{1}{10} \sum_{l=1}^{10} n_l^k$$

The average noise vector N will be referred to as a noise pattern hereinafter.

"Evaluation of the speech feature vector Bi-S12"

After the evaluation of the noise pattern N, an input speech to be recognized is input. Then the feature vectors Ai of the input speech are evaluated by the signal processor 15.

The speech feature vectors Ai having been input are corrected by use of the noise pattern. Namely, a subtraction between a feature vector Ai output from the signal processor 15 and the noise pattern N having been stored in the noise pattern memory 20 is effected, whereby a corrected speech feature vector $Bi = (bi^1, bi^2, \ldots, bi^k, \ldots bi^K)$ is evaluated in accordance with the following expression (1):

$$b_i^k = \begin{cases} ai^k - n^k & (\text{if } ai^k > n^k) \\ 0 & (\text{if } ai^k < n^k) \end{cases} \quad (1)$$

The speech feature vector Bi evaluated as such is successively stored in the working memory 19. The processing is effected for each speech frame of the input speech. Moreover, speech feature vectors Bi prior to the start point detection described later are unnecessary, and hence properly discarded.

"Detection of a voiced interval-S13"

Then, a frame power Pi of each speech frame will be evaluated by use of the speech vector Bi having been stored in the working memory 19. Here, Pi satisfies a relation:

$$Pi = \|Bi\| = \sqrt{\frac{1}{K} \sum_{k=1}^{K} (b_i^k)^2}.$$

In succession, the frame power Pi so evaluated and a preset interval detection threshold Ps are compared, whereby the start point S and the end point E of the speech in concern is determined. Hereupon, to detect the start point of a speech with ease, such an algorithm may be employed, for example, wherein the algorithm assumes as the start point S a head speech frame whose speech power Pi exceeds the threshold Ps over three successive speech frames, but other algorithms may also be employed.

Furthermore, to simply detect the end point E of a speech, such an algorithm may be employed, for example, but with no limitation thereto that the algorithm assumes as the end point E a frame ahead by one of a head speech frame whose frame power Pi is less than the threshold Ps over thirty successive speech frames.

When no end point E of the voiced interval is detected (S14), the evaluation (S12) of the speech feature vector Bi is again effected, and thereafter the detection (S13) of the voiced interval is repeated for finally detecting the end point E (S14).

FIGS. 5(A) and (B) respectively show the frame power characteristic when an input speech is assumed to be "SAPPORO". FIG. 5(A) illustrates the frame power Pi evaluated from the speech feature vector Bi under a noiseless environment, while FIG. 5(B) illustrates the frame power Pi' evaluated from the feature vector Ai under a noisy environment of 10 dB S/N ratio with use of the same technique as that of FIG. 5(A). These frame powers are respectively plotted on the ordinate while time is plotted on the abscissa.

As understood from FIGS. 5(A) and (B), the frame power Pi yielded from the speech feature vector Bi from which a noise pattern has been subtracted is obviously distinguishable in the voiced and unvoiced intervals. Thus, voiced intervals can be detected with ease even under noisy environment.

"Evaluation of the local peaks vectors-S16"

Then, the local peaks vectors Ri will be evaluated with use of the speech feature vectors Bi having been stored in the working memory 19.

This will be described with reference to FIGS. 6(A), (B), and (C). First, each component $b_i^k$ of the each speech feature vector Bi is logarithmically converted in accordance with the following expression (2).

$$x_i^k = \begin{cases} \log b_i^k & (\text{if } b_i^k \geq l) \\ 0 & (\text{if } 0 \leq b_i^k < l) \end{cases}$$

FIG. 6(A) exemplarily shows the logarithmic conversion of each component of the speech feature vector Bi where a channel number k is plotted on the abscissa while $X_i^k$ on the ordinates. As is evidenced from the figure, a shape of a logarithmic spectrum of a speech in the ith speech frame can be found.

In succession, by use of a least square fit line given by the following expression (3):

$$y_i^k = U_i^k \cdot k + v_i^k$$

$$u_i^k = \frac{K \cdot \sum_{k=1}^{K} k \cdot x_i^k - \sum_{k=1}^{K} k \cdot \sum_{k=1}^{K} x_i^k}{K \sum_{k=1}^{K} (k)^2 - \left(\sum_{k=1}^{K} k\right)^2}$$

$$v_i^k = \frac{\sum_{k=1}^{K} (k)^2 \cdot \sum_{k=1}^{K} x_i^k - \sum_{k=1}^{K} k \cdot x_i^k \sum_{k=1}^{K}}{K \sum_{k=1}^{K} (K)^2 - \left(\sum_{k=1}^{K} k\right)^2}$$

In these expressions, k in $X_i^k$, $y_i^k$, $u_i^k$, and $v_i^k$ is a superscript indicative of the channel number k = 1, 2, ..., K. The resultant spectrum is normalized in accordance with the following expression (4).

$$z_i^k = x_i^k - y_i^k \qquad (4)$$
$$= x_i^k - u_i^k \cdot k - v_i^k$$

FIG. 6(B) shows an example of the speech feature vector component $Z_i^k$ spectrum-normalized as such, where channel numbers are plotted on the abscissa and $Z_i^k$ on the ordinates.

Then, a local peaks vector Ri composed of components $r^k$ is evaluated by making logic "1" components $Z_i^k$ of the spectrum normalized speech feature vector Zi corresponding to channels being the local maximum in a frequency direction of the vector Zi while making logic "0" the other components $Z^k$ of the vector Zi, more particularly a local peaks vector $R_i$ is evaluated based on the following conditions (5) using the $Z_i^k$.

$$\begin{rcases} z_i^k > z_i^{k+1} \text{ and} \\ z_i^{k-1} < z_i^k \text{ and} \\ z_i^k > 0 \\ \text{provided} \quad k = 1 \sim k \\ z_i^0 = -\infty \\ z_i^{k+1} = -\infty \end{rcases} \quad (5)$$

Figure 6:
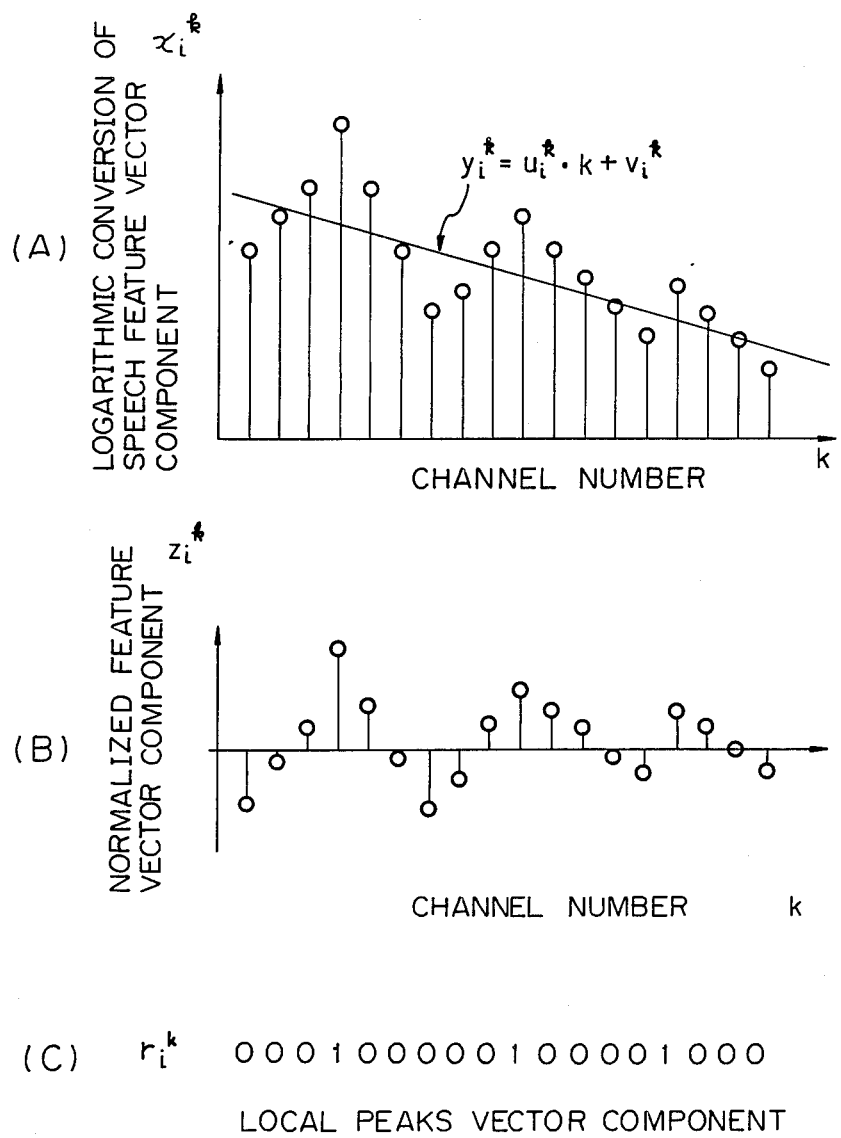
FIGS. 6(A) to (c) are respectively views illustrating evaluation of a local peaks vector.

Hereby, a vector Ri having a component $r_i^k=1$, with k satisfying the above conditions, and having a component $r_i^k=0$, with k not satisfying the above conditions, i.e., $$Ri = (r_i^1, r_i^2, \ldots, r_i^k, \ldots, r_i^K)$$

is evaluated. This is called a local peaks vector. FIG. 6 (C) is an example of this local peaks vector Ri. The local peaks vector Ri evaluated as such is stored in the working memory 19. This is also performed for each speech frame period.

"Evaluation of the pattern similarity-S17"

First, a series of local peaks vectors located from the start point of any speech signal to the end point thereof among input local peaks vectors stored in the working memory 19 are assumed to be an input pattern. The pattern similarity is evaluated between the input pattern described above and each of a reference patterns stored previously in the reference pattern memory 18.

The reference pattern will now be described.

In a specific speaker recognition system where a speaker is limited, a word being a recognition object must be previously uttered, and a pattern for expressing the word (referred to as a reference pattern) must be previously stored. The reference pattern memory 19 stores such reference patterns therein. A method of preparing the reference pattern is as follows. Here, the processing of preparing the reference pattern is called registration processing.

The number of recognition words are here assumed to be M and the number of reference pattern for each word assumed to be one, for brevity of the description. In addition, although another method of preparing such a reference pattern is also known where the same word is uttered several times and patterns thereof are averaged, in the present invention a reference pattern is assumed to be prepared when a word is uttered only one time. Any speech for use in preparation of such a reference pattern is called a learning speech. For this learning speech, the abovedescribed various processings of evaluation of feature vectors Ai (S10), evaluation of a noise pattern (S11), evaluation of speech feature vectors Bi(S12), detection of the voiced interval (S13), and evaluation of local peaks vectors (S16) are effected for estimating a reference local peaks vectors S(m)j. Here, m designates the number of a reference pattern while j the number of a speech frame. For simplifying the description, a start point of the learning speech yielded in the voiced interval detection (S13) is is assumed to be 1 while an end point assumed to be Jm. Accordingly, a reference local peaks vector S(m)j of a learning speech of a word name CTm is expressed as follows.

$$S(m)j = \{S(m)_j^1, S(m)_j^2, \ldots, S(m)_j^k, \ldots, S(m)_j^K\}$$

Moreover, a pattern expressible by a time series of reference local peaks vectors from the start point 1 of the learning speech to the end point Jm thereof is called a reference pattern and is expressed as Sm. Here, m represents the number of a reference pattern. The reference pattern Sm is stored in the reference pattern memory 18 together with a length Jm thereof and a corresponding word name name CTm. While the processing of preparing the reference pattern as described above was designated as the registration processing, processing of recognizing an input speech is designated as recognition processing. Thereupon, any speech input in the recognition processing is called an input speech. For this input speech, the numbers of speech frames from the start point S to the end point E thereof evaluated in the voiced interval detection (S13) are respectively converted from 1 to F (here, F=S−E+1). An input speech pattern expressible in such a manner by a time series of input local peaks vectors from the start point to the end point thereof is assumed as an input pattern R. The input pattern R has been stored in the working memory 19 as previously described.

Furthermore, as described previously, a mth reference pattern Sm is expressed as a time series from the start point 1 to the end point Jm thereof and has been stored in the reference pattern memory 18.

In succession, evaluation of similarity between the input pattern R and the reference pattern Sm is as follows. The processing is effected using a dynamic programming method in the present invention.

Figure 7:
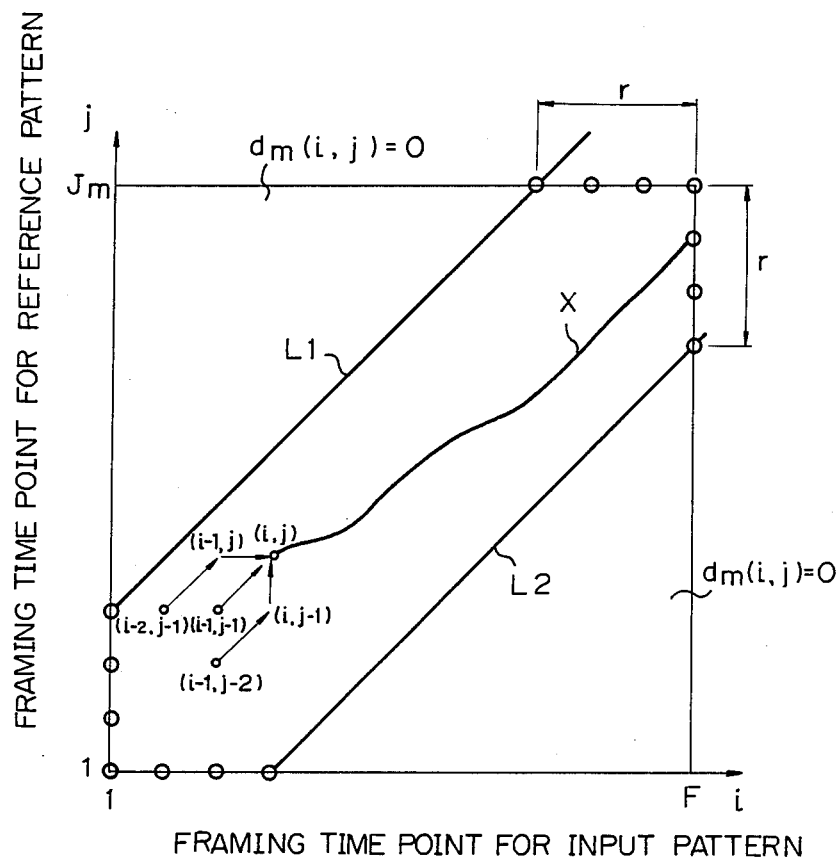
FIG. 7 is a view illustrating evaluation for pattern similarity with use of a dynamic programming method.

FIG. 7 is a view illustrating a timing relation between an input pattern and a reference pattern upon evaluating similarity therebetween, wherein framing time points i of the input pattern are plotted on the abscissa and the same points j of the reference pattern are plotted on the ordinates, and r is a matching window length.

Thereupon, in discussing any problem on the ith and jth framing time points of an input pattern and a reference pattern, a simple expression "lattice point (i, j)" is employed.

Similarity dm (i,j) between an input local peaks vector Ri and a reference peaks vector S(m)j at a lattice point (i, j) is defined by the following equation (6):

$$dm(i,j) = \frac{R_i \cdot S(m)_j^t}{\sqrt{R_i \cdot R_i^t} \sqrt{S(m)_j \cdot S(m)_j^t}} \quad (6)$$

Here, a superscript t shows transpostion of any vector.

Generally, evaluation of similarity expressed by the above equation typically requires a complicated operation, but respective vectors Ri and S(m)j in the present invention are respectively a local peaks vector whose element is 0 or 1, and hence similarity operation can sharply be facilitated. In this sense, a method of expression for a speech pattern in terms of a local peaks vector in the present invention presents important significance.

In addition to simplify the operation described above, such convenient processing may also be allowed in the present invention in that calculation of the similarity by the above equation is limited only to a region put between lines L1 and L2 shown in FIG. 7 and is obliged to satisfy a relation dm(i,j)=0 in any other region. But, this is not essential and so the description will be omitted. Here, the region not obliged to satisfy the relation dm(i.j)=0 is called the inside of a matching window.

Subsequently, accumulative similarity Dm(i,j) at a lattice point (i,j) and a path length Qm (i,j) at the same point are defined by the following equation (7):

$$D_m(i,j) = \min \begin{cases} D_m(i-2, j-1) + 2d_m(i-1,j) + d_m(i,j) & (a) \\ D_m(i-1, j-1) + 2d_m(i,j) & (b) \\ D_m(i-1, j-2) + 2d_m(i,j-1) + d_m(i,j) & (c) \end{cases}$$

$$Q_m(i,j) = \begin{cases} Q_m(i-2, j-1) + 3 & (\text{if } (a)) \\ Q_m(i-1, j-1) + 2 & (\text{if } (b)) \\ Q_m(i-1, j-2) + 3 & (\text{if } (c)) \end{cases} \quad (7)$$

To estimate here the accumulative similarity Dm(i,j) at the lattice point (i,j), it is necessary to calculate similarity at lattice points (i,j), (i−1, j), and (i, j−1) and accumulative similarity at lattice points (i−2, j−1), (i−1, j−1), and (i−1, j−2). In this sense, the equation (7) is a recurrence formula, and hence requires an initial value.

Those initial values required in this case are as follows:

$$\begin{aligned} d_m(0,j) &= 0, \; d_m(i, 0) = 0 \\ D_m(0,j) &= D_m(-1,j) = D_m(i, 0) = D_m(i, -1) = 0 \\ Q_m(0,j) &= Q_m(-1,j) = Q_m(i, 0) = Q_m(i, -1) = 0 \end{aligned} \quad (8)$$

There are various methods to estimate the accumulative similarity Dm(i,j) other than the method given by the equations (7) and (8). The following is a typical method thereamong. Recurence formula:

$$D_m(i,j) = \min \begin{cases} D_m(i-1,j) + d_m(i,j) & (a) \\ D_m(i-1,j-1) + d_m(i,j) & (b) \\ D_m(i-1,j-2) + d_m(i,j) & (c) \end{cases} \quad (7')$$

$$Q_m(i,j) = \begin{cases} Q_m(i-1,j) + 1 & (\text{if } (a)) \\ Q_m(i-1,j-1) + 1 & (\text{if } (b)) \\ Q_m(i-1,j-2) + 1 & (\text{if } (c)) \end{cases}$$

Initial Value:

$$\left.\begin{array}{l} D_m(o,j) = 0 \\ Q_m(o,j) = 0 \end{array}\right\} \quad (8')$$

In this case, the path length $Q_m(i,j)$ satisfies:

$$Q_m(i,j) = i,$$

and particular operation of $Q_m(i,j)$ becomes unnecessary.

Maximum accumulative similarity Dmax(m) is then evaluated by the following equation (9), which similarity is selected from the accumulative similarity at the lattice point (i,j) yielded as such within the matching window and from accumulative similarity satisfying (i=F or j=Jm):

$$D_{max}(m) = \max \begin{cases} \frac{D_m(i,j)}{Q_m(i,j)} & (\text{here, } i = F, J_m - r \leq j \leq J_m) \\ \frac{D_m(i,j)}{Q_m(i,j)} & (\text{here, } F - r \leq i \leq F, j = J_m) \end{cases} \quad (9)$$

The maximum accumulative similarity Dmax(m) is called pattern similarity.

The operation described above is effected for all reference speech patterns of M categories, and M pattern similaries Dmax(m) are evaluated and stored in the working memory.

FIG. 7 shows a predicted example of a final path estimated as such as a curve X.

"Judgement processing-S19"

The judgement processing detects a maximum value among the M pattern similarities Dmax(m) stored in the working memory 19 as shown by the following equation:

$$m_{max} = \arg \max_{1 \leq m \leq M} D_{max}(m) \quad (10)$$

A word name CTm$_{max}$ corresponing to the number m$_{max}$ of the maximum pattern similarity is delivered as a recognized result to the outside through the interface 21.

"Experimental result."

In the following, an experimental result will be described for confirming the effect of a first embodiment of the present invention.

This was done by simulation using speech data when a man speaks the names of one hundred cities.

The simulation experiment was performed with respect to the following four cases by using an input speech composed of speech data of the one hundred city names and automobile noise added to the above speech data so as to provide a S/N of 10 dB and a learning speech prepared by another speaking about the one hundred city names by the same speaker.

(Experiment 1)-Present Invention

A speech recognition system according to the present invention. The input pattern is prepared from the input local peaks vectors Ri.

(Experiment 2)

The input pattern is prepared from the local peaks vectors directly available from the featured vectors Ai of an input speech.

(Experiment 3)

The input pattern is prepared using the speech feature vectors Bi of an input speech.

(Experiment 4)

The input pattern is prepared from the feature vectors Ai of an input speech. In addition, reference patterns are prepared by the same processing as in the input pattern with respect to a learning speech, and the pattern similarity evaluation procesing and the judgement processing were performed using the same processings of the present invention as those described previously.

A recognition result is shown in the following table.
Experiment 1 (present invention): 95%
Experiment 2: 85%
Experiment 3: 87%
Experiment 4: 35%

The effect of the present invention was confirmed from the experimental result in that according to the recognition system of the present invention employing local peaks vectors evaluated from the speech feature vector, highly accurate speech recognition would be assured even under a noisy environment as compared with prior methods.

A second embodiment of the present invention will be described in succession. A block diagram of a speech recognition apparatus for effecting the second embodiment is shown in FIG. 2 in the same manner as in the first embodiment.

Figure 8:
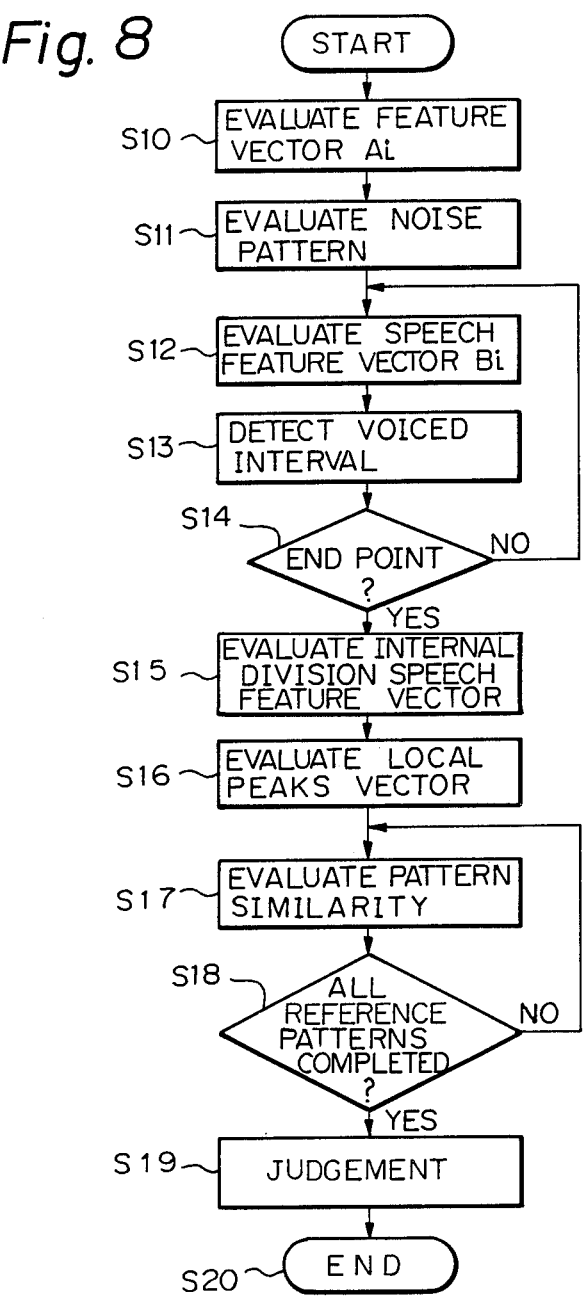
FIG. 8 is a flowchart illustrating processings of second and third embodiments of the present invention.

Procedures of processing the second embodiment include, as shown in a flowchart of FIG. 8, the steps of: evaluation of speech feature vectors Ai(S10); evaluation of a noise pattern (S11); evaluation of speech feature vectors Bi(S12); detection of a voiced interval (S13); evaluation of internal division speech feature vectors (S15); evaluation of local peaks vectors (S16); evaluation of pattern similiarity (S17); and judgement (S19).

The processings from the evaluation of speech feature vectors Ai (S10) to the detection of a voiced internval (S13) are the same as those in the first embodiment, and hence the description will be omitted.

"Evaluation of internal division speech feature vectors-S16"

After detection of the end point of the voiced interval, the processor 16 prepares an internal division speech feature vectors Ch using the speech feature vector Bi stored in the working memory 49, and the start point S and end point E of the voiced interval.

First, the speech feature vectors are linearly time-expanded or time-compressed to a prescribed speech frame length employing the start point S and end point E detected by the detection processing of a voiced internval (S13).

This linear expansion processing is to facilitate the pattern similarity evaluation as well as to facilitate the control of an area in a memory for storing a speech pattern prepared by the present invention.

This linear expansion processing means either a linear expansion processing or a linear compression processing.

Figure 9:
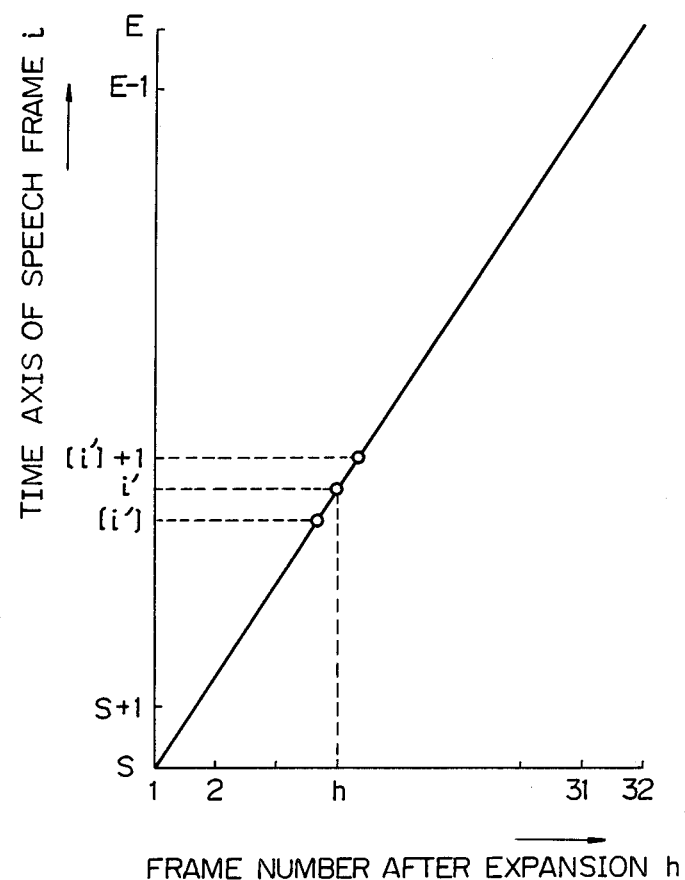
FIG. 9 is a view illustrating linear expansion of a time axis of an input pattern.

The following will describe a method of the linear time expansion with reference to FIG. 9.

As shown in FIG. 9, illustrating the linear time expansion method, the frame number (h) after the expansion is plotted on the abscissa while the time axis (i) of a speech frame is plotted on the ordinates. A vector yielded by the linear expansion is here called an internal division speech feature vector.

In addition, the number of speech frames after the linear expansion is assumed for brevity to be 32 frames for example, but the method is not limited thereto.

It is now assumed an internal division speech feature vector of a hth (h=1 through 32) speech frame after the linear expansion to be Ch.

First, a position (i') on the time axis (i) of a speech frame corresponding to the frame number h after expansion is estimated in conformity with the following equation (11), when the speech frame from the start point S to the end point thereof is equally divided into thirty one fractions:

$$i' = \frac{S(32 - h) + E(h - 1)}{32 - 1} \qquad (11)$$

Then, feature vectors $B_{[i']}$, $B_{[i']+1}$ of two speech frames [i'], [i]+1 putting the position (i') therebetween are internally divided for evaluating an internal division speech feature vector Ch employing the following equation (12):

$$Ch = B_{[i']}([i']+1-i') = B_{[i']+1}(i'-[i']) \qquad (12)$$

Here, [ ] denotes a gaussian symbol.

The internal division speech feature vectors Ch evaluated as such are stored in the working memory 19. Thereupon, the number of the speech frames after the linear expansion becomes 32.

"Evaluation of the local peaks vectors-S16"

In the following, input local peaks vectors Rh are estimated. This processing is the same as the evaluation processing of local peaks vectors (S16) described in the first embodiment and hence the description will be omitted.

The input local peaks vectors Rh so evaluated are stored in the working memory 19. An input speech pattern expressible by these thirty two input local peaks vectors Rh provides an input patern R.

"Evaluation of pattern similarity-S17"

This processing evaluates, by employing a series of the thirty two input local peaks vectors stored in the working memory 19 as an input pattern R, pattern similarity between the input pattern R and reference patterns Sm stored previously in the reference pattern memory 18.

The reference patterns are prepared substantially in the same manner as that described in the first embodiment except that the evaluation of the internal division speech feature vectors (S15) described above is additionally employed. Namely, these reference patterns are previously prepared by the respective steps of: the evaluation of the feature vectors Ai (S10); the evaluation of the noise pattern (S11); the evaluation of the speech feature vectors Bi (S12); the detection of a voiced interval (S13); the evaluation of the internal division speech feature vectors Ch (S15); and the evaluation of local peaks vectors, and stored in the reference pattern memeory 18. The maximum value Dmax(m) of the pattern similarity between the input patter R stored in the working memory 19 and the reference pattern Sm stored in the reference pattern memory 18 is evaluated by the dynamic programming method in the same manner as in the evaluation of the pattern similarity (S17) of the first embodiment. The operation described above is executed for all reference patterns of M words to evaluate the M pattern similarities Dmax(m), and they are stored in the working memory 19.

"Judgement processing-S19"

The judgement processing is also the same as that in the first embodiment, and detects the maximum value among the M pattern similarities Dmax(m) (m=1, 2, .. . , M.). A word name CTmax corresponding to the number m max of a reference pattern providing the maximum value so detected is delivered as a recognized result to the outside via the interface 21.

Although in the above description the evaluation of the internal division speech feature vectors was effected by linearly expanding speech frames from the start point to the end point of an input speech to a prescribed speech frames length, the present invention is not necesarily limited to the method of uniformly and linearly expanding the input speech from the start point to the end point. Namely, another method is also applicable to the present invention where in some part of a train of internal division speech feature vectors are evaluated by means of processing of internally dividing adjacent two speech feature vectors for yeilding local peaks vectors. For example, a method is applicable of expanding only a speech stationary part to prepare a speech pattern.

Subsequently, a third embodiment of the present invention will be described. A speech recognition apparatus for executing the third embodiment is shown in FIG. 2 as in the first and second embodiment. Moreover, procedures of processing the third embodiment are the same as those in the first embodiment, and shown in the flowchart of FIG. 4. A different point of the third embodiment from the first embodiment is the processing of a local peaks vectors (S16).

First, the processing from the evaluation of the speech feature vector Ai (S10) to the detection of a voiced interval (S13) is the same as in the first embodiment, and hence the description will be omitted.

"Evaluation of local peaks vectors-S16"

Figure 10:
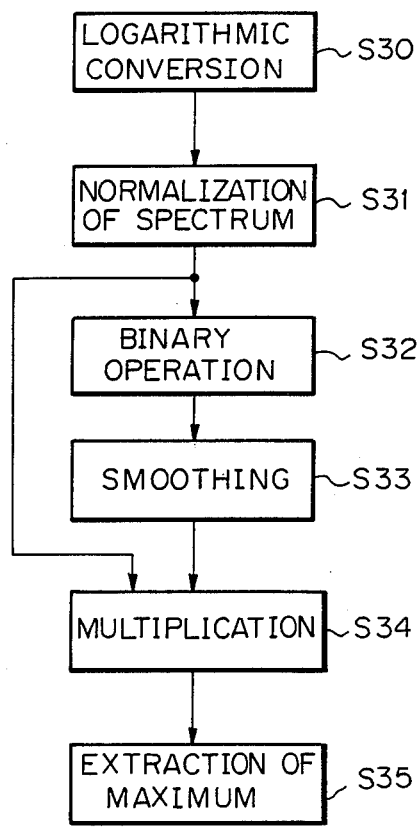
FIG. 10 is a flowchart illustrating evaluation for a local peaks vector in the third and fourth embodiments of the present invention.

The processing evaluates local peaks vectors Ri using the speech feature vectors Bi stored in the working memory 19 in the evaluation processing (S12) of the speech feature vectors Bi. This is illustrated by a flowchart of FIG. 10.

First, each component of the speech feature vector Bi is subjected to logarithmic-conversion (S30) in accordance with the following equation (S13):

$$X_i^k = \begin{cases} \log b_i^k & (\text{if } b_i^k \geq 1) \\ 0 & (\text{if } 0 \leq b_i^k < 1) \end{cases} \quad (13)$$

Then, the resultant component so subjected to logarithmic-conversion is spectrum-normalized (S31) according to equation (15) employing a least square fit line provided by the following equation (14):

$$\left. \begin{array}{l} y_i^k = U_i^k \cdot k + v_i^k \\[6pt] U_i^k = \dfrac{K \cdot \sum\limits_{k=1}^{K} k \cdot X_i^k - \sum\limits_{k=1}^{K} k \cdot \sum\limits_{k=1}^{K} x_i^k}{K \sum\limits_{k=1}^{K} (k)^2 - \left(\sum\limits_{k=1}^{K} k\right)^2} \\[18pt] V_i^k = \dfrac{\sum\limits_{k=1}^{K} (k)^2 \cdot \sum\limits_{k=1}^{K} x_i^k - \sum\limits_{k=1}^{K} k \cdot X_i^k \sum\limits_{k=1}^{K} k}{K \sum\limits_{k=1}^{K} (k)^2 - \left(\sum\limits_{k=1}^{K} k\right)^2} \end{array} \right\} \quad (14)$$

where k appearing in $X_i^k$, $y_i^k$, $U_i^k$, and $v_i^k$ is a superscript indicative of a channel number.

$$z_i^k = x_i^k - y_i^k = x_i^k = u_i^k k - v_i^k \quad (15)$$

Figure 11:
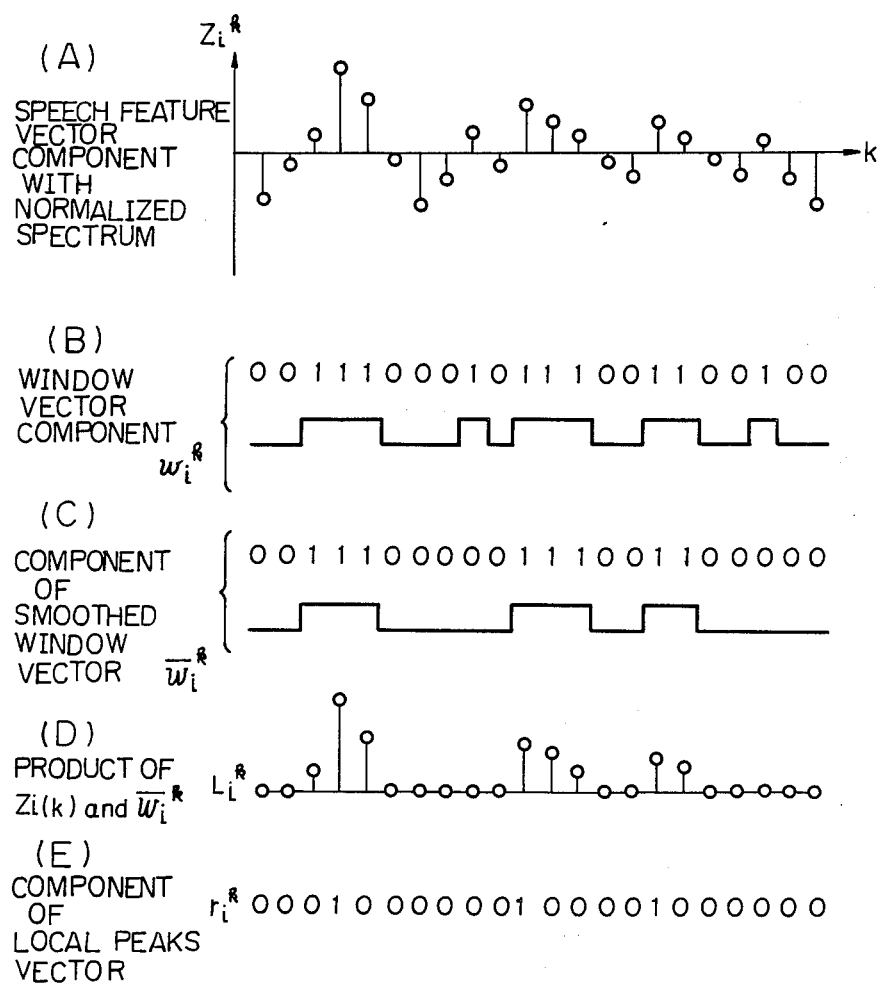
FIGS. 11(A) to (E) are respectively views illustrating the evaluation for the local peaks vector shown by the flowchart of FIG. 10.

FIG. 11 (A) is an example of the speech feature vector components $Z_i^k$ spectrum-normalized as such wherein the channel number k is plotted on the abscissa while $Z_i^k$ on the ordinates.

The spectrum-normalized speech feature vector component $Z_i^k$ are converted to a binary window vector components $w_i^k$ by binary coded operation (S32) using the following equation (16):

$$w_i^k = \begin{cases} 1 & (\text{if } Z_i^k > 0) \\ 0 & (\text{if } Z_i^k \leq 0) \end{cases} \quad (16)$$

where $wi^1, wi^2, \ldots, wi^k, \ldots, wi^K$ are respectively a component of the window vector Wi and k (k=1, 2, .., K) designates the channel number. The window vector Wi is expreessed as follows:

$$Wi = (wi^1, wi^2, \ldots, wi^k, \ldots, wi^K)$$

In succession, the window vectors Wi are smoothed by the smoothing processing (S33) to yield smoothed window vectors $\overline{Wi} = (\overline{wi^1}, \overline{wi^2}, \ldots, \overline{wi^k}, \ldots, \overline{wi^K})$.

The smoothing is achieved by making zero a component $wi^k$ of Wi when the component does not continue to be 1 over two channels.

For example, the components logic "010110" is smoothed as logic "000110". Moreover, a product $L^K$ of each component $\overline{wi^k}$ of the smoothed window vector $\overline{Wi}$ and each component $Zi^k$ of the spectrumnormalized speech feature vector is evaluated (S34) based on the following equation (17)

$$L_i^k = Z_i^k \cdot \overline{W}_i^k \quad (17)$$

(where $L_i^k$ are components of the vector Li, and k represents a channel number k=1 to K).

Then, the local peaks vector Ri, composed of components $r_i^k$, is evaluated by making logic "1" components $L_i^k$ of the vector Li corresponding to channels being the local maximum in a frequency direction of the vector Li while making logic "0" the other components $L^k$ of the vector Li, more particularly the input local peaks vector $Ri = (ri^1, ri^2, \ldots, ri^k)$, extraction processing (S35) is effected by using the following conditional equation (18):

$$\left. \begin{array}{l} L_i^k > L_i^{k+1} \text{ and} \\[4pt] L_i^{k-1} < L_i^k \\[4pt] \text{where} \quad k = 1, \ldots, K \\[4pt] L_i^0 = -\infty \\[4pt] L_i^{K+1} = -\infty \end{array} \right\} \quad (18)$$

Each component $ri^k$ has a value $ri^k=1$ for k satisfying the above condition, or has a value $ri^k=0$ for k not satisfying the above conditions. Here, $ri^1, ri^2, \ldots, ri^K$ are respectively a component of the input local peaks vector Ri.

FIG. 11 (a) is an example of the spectrum-normalized components $zi^k$, FIG. 11 (b) is an example of components $wi^k$ of the window vector Wi, FIG. 11 (c) is an example of components $\overline{wi^k}$ of the window vector $\overline{Wi}$ smoothed as above, FIG. 11 (d) is an exmaple of products $Li^k$ of $Zi^k$ and $\overline{wi^k}$, and FIG. 11 (e) is an example of components ri of the local peaks vector Ri.

The input local peaks vector Ri so evaluated is stored in the working memory 19. This processing is executed for each speech frame period.

"Evaluation of pattern similarity-S17"

The processing is the same as that in the first embodiment. Namely, a series of the input local peaks vector stored in the working memory 19 are assumed as the input pattern R, and pattern similarity is evaluated between the reference patterns (for example, the numbers of the reference patterns are supposed to be M) previously stored in the reference pattern memoery 18. The reference pattern also comprises a series of the reference local peaks vectors yielded by extracting the local maximum value of a product of $L_i^k$ of the each component $\overline{Wi}$ of the smoothed window vectors and each component $Zi^k$ of the feature vectors as described before. The maximum value D max(m) of the pattern similarity between the input pattern R and each of the reference patterns is evaluated by the dynamic programming method like that of the first embodiment. The above operation is effected for reference patterns of M catagories, and M pattern similarities D max(m) are evaluated. The result is stored in the working memeory 19.

"Judgement processing-S19"

This is also the same as in the first embodiment. Namely, the maximum value among M pattern similarities D max(m) is detected. Here, m=1, 2, ..., M. A word name CTmax corresponding to the number m max of a reference pattern providing the maximum value described above is delivered to the outside through the interface 21 as a recognized result.

Subsequently, a fourth embodiment of the present invention will be described. A block diagram of a speech recognition apparatus for executing the fourth embodiment is shown in FIG. 2 in the same manner as the first through third embodiments.

The processing in the fourth embodiment is a combination of the above-described second and third embodiments, procedures of which is the same as that of the second embodiment and is shown by a flowchart of FIG. 8.

A different point of this fourth embodiment from the second embodiment is in the processing contents of the local peaks vector evalauation (S16). For the local peaks vector evaluation (S16) in the fourth embodiment, the local peaks vector evaluation (S16) described in the third embodiment is employed.

On this occasion, the reference pattern has previously been prepared in the same manner. Accordingly, in this fourth embodiment, the processing from the speech feature vector Ai evaluation (S10) to the voiced interval detection (S13) is the same as that of the first embodiment. The next speech processing, i.e., the internal division vector Ch evaluation processing (S15) is the same as that of the second embodiment. Thus succeeding local peaks vector evaluation (S16) is the same as that in the third embodiment. The pattern similarity evaluation (S17) and the judgement (S19) thereafter is the same as that of the third embodiment. Also, for the second through fourth embodiments, an experiment for checking recognition accuracy was performed in the same manner as in the first embodiment. As a result, the same recognition rate as in the first embodiment was obtained. The pattern similarity evaluation is the first through fourth embodiments described previously was performed by the nonlinear matching using the dynamic programming method, but this evaluation can be performed by means of the linear matching. When performing the pattern similarity evaluation (S17) in the first and third embodiments with use of the linear matching, the local peaks vector evaluation (S16) is conducted, and thereafter a time series of the input local peaks vector from the start point S to end point E of the input speech is subjected to time axis linear expansion into a prescribed speech frames length.

"Linear expansion"

The linear expansion processing is mainly to facilitate linear matching described later and is furthermore to facilitate area control upon storing a reference pattern described later in a memory.

In succession, a method of the time axis linear expansion will be described. A case is described for brevity where input local peaks vectors are linearly expanded into thirty two speech frames. The start point and the end point are respectively assumed to be S and E, and a speech frame number after the linear expansion is assumed to be $i'$ ($i'=1$ through 32), and a speech frame number before the linear expansion is assumed to be $i$. The speech frame number $i$ is evaluated using the following equation (19):

$$i = \left[ \frac{s(32 - i') + E(i' - 1)}{32 - 1} \right] \quad (19)$$

and an input local peaks vector Ri in the ith speech frame before the linear expansion is assumed to be an input local peaks vector $R_{i'}$ in the $i'$th speech frame after the linear expansion. Here, the symbol [] in the equation (19) shows the Gaussian symbol. As a result, a series of input local peaks vectors from the start point to the end point of the input speech, $$R^s, R^{s+1}, \ldots, R^{E-1}, R^E$$

is linearly expanded into a series of vectors, $$R1, R2, \ldots, Ri', \ldots, R31, R32.$$

The series of the input local peaks vectors R1, R2, ..., R32 linearly expanded as such is stored in the working memory 19.

"Evaluation of patern similarity (linear matching)-S17"

This processing takes the series of the input local peaks vectors R1–R32 after the linear expansion stored in the working memory 19 as the input pattern R, and evaluates pattern similarity between the input pattern R and reference patterns Sm (m=1 to M) previsously stored in the reference pattern memory 18 by making use of the linear matching method.

Here, each reference pattern Sm is prepared in the same format as that of the input pattern. Namely, as shown in the following expression, the reference pattern sm is a series of vectors comprising thirty two reference local peaks vectors:

$$Sm = (S(m)1, S(m)2, \ldots, S(m)i', \ldots S(m)32)$$

Subsequently, the evaluation of the pattern similarity between the input pattern R and the reference pattern using the linear matching method is as follows:

The pattern similarity Dm between the input pattern 12 represented by thirty two input local peaks vectors Ri' and the reference pattern Sm represened by thirty two reference local peaks vectors S(m)i' is given by the following equation (20):

$$D_m = \sum_{i=1}^{32} \frac{R_{i'} \cdot S^t_{(m)i'}}{\sqrt{R_{i'} \cdot R^t_{i'}} \sqrt{S_{(m)i'} \cdot S^t_{(m)i'}}} \quad (20)$$

where superscript t means transposition of a vector. The operation described above is executed for all the reference patterns of M categories for yielding M pattern similarities Dm, which similarities are then stored in the working memory 19.

"Judgement"

This judgement processing detects the maximum value among the M pattern similarities Dm stored in the working memory 19, as shown in the following equation:

$$m_{(max)} = arg \max_{1 \leq m \leq M} Dm$$

A word name CTmmax corresponding to the number mmax of the maximum reference pattern is delivered as a recognized result to the output through the interface 21.

In addition, when the pattern similarity evaluation (S17) in the second and fourth embodiments is conducted by the linear matching, the input pattern R has been linearly expanded to a prescribed speech frames length (32 frames for example) in the internal division speech feature vector evaluation (S15).

Therefore, the pattern similarity evaluation (S17) can be conducted by the linear matching method. The judgement processing (S19) thereafter is also the same as before.

Also for the respective embodiments where the pattern similarity evaluation is conducted by the linear matching, experiments for checking recognition accuracy were performed in the same manner as the first through fourth embodiments. As a result, sufficiently satisfactory recognition rates were yielded although they were slightly low as compared to the first through fourth embodiments.

Designation of the respective embodiments described above is for recogniation of a sound uttered by a specific speaker. Namely, registration of a reference pattern into the reference pattern memory by a learning speech of a specific speaker is conducted before starting of the recognition processing in the same manner as the preparation processing of the input pattern described above, and thereafter recognition processing for a sound uttered by the speaker is effected.

The present invention is applicable to recognition of an unspecific speaker in addition to the specific speaker recognition.

In effecting the unspecific speaker recognition, reference patterns by learning speeches of many and unspecified speakers are prepared in the same manner as the input pattern preparation processing and stored previously in the reference pattern memory. Then an input speech is subjected to the recognition processing by the use of the reference pattern.

Moreover, in the description of the respective embodiments described before, a processor executes each processing step in accordance with a program stored in the program memory, but a special-purpose hardware corresponding to these respective processings can of course be employed.

As evidenced from the above description, according to the present invention, the voiced interval is detected using frame powers which is evaluated using a speech feature vector of an input speech from which a noise pattern has been eliminated. Accordingly, the voiced interval is detected with accuracy as evidenced from a comparison between the first power Pi estimated using the speech feature vector and the frame power Pi' estimated using a non-processed feature vector as shown in FIGS. 5 (A) and (B). Thus, the system of the present invention can recognize an input speech with high accuracy even under noisy environments.

In additon, according to the present invention, pattern similarity evaluation is effected using local peaks vectors having only its component of logic "1" or logic "0" evaluated from the speech feature vectors. Thus, the operation thereof is extremely simplified.

Moreover, a reference local peaks vectors are employed also for the reference pattern, so that storage capacity therefor can greatly be reduced for miniaturizing the speech recognition system.

Furthermore, when speech frames lengths of the input and reference patterns make respectively a prescribed constant speech frames length, storage capacities of the memories for the reference pattern or input pattern can be made equal to with each other, so that the memory control of the system is facilitated.

In addition, even if an input pattern and reference patterns are expanded into a prescribed speech frames length (32 frames for example), an input pattern and reference patterns which faithfully reproduces features of the original input pattern and reference patterns can be obtained by effecting the internal division speech feature vectors shown in the second and fourth embodiments described previously, whereby highly accurate speech recognition can be asssured. Furthermore, as described in the third embodiment, according to the present invention, a local peaks vectors are evaluated by estimating window vectors from feature vectors after spectrum normalization of an input speech, smoothing the window vectors, and multiplying the feature vector after the spectrum normalization by the smoothed window vectors as a spectrum window. Accordingly no erroneous descrimination is produced between a local peak due to noises and that due to a speech for assuring highly accurate processings in the similarity evaluation with each reference pattern and judgement thereof.

As clearly evidenced from the above description, according to the present invention, a speech recognition system with excellent recognition accuracy can be assured.

From the foregoing, it will now be apparent that new and improved speech recogniation method and system have been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A speech recognition method for recognizing and input speech comprising the steps of:
    (a) evaluating a noise pattern N by time-averaging feature vectors Nl, where l is a subscript indicative of a frame number, within a prescribed noise detection interval prior to input speech, each of said feature vectors Nl being composed of a plurality of channel components evaluated by frequency-analyzing environmental noise;
    (b) frequency-analyzing the input speech to evaluate a feature vector Ai, where i is a subscript indicative of a speech frame number, each composed of a plurality of channel components of a plurality of channels corresponding to frequency components of the input speech at a prescribed speech frame period;
    (c) converting said feature vector Ai of the input speech to local peaks vector Ri;
    (d) evaluating pattern similarities between an input pattern composed of a time series of local peaks vectors Ri from the start point to the end point of an input speech and a plurality of previously prepared reference patterns of the same format as that of said pattern by making use of pattern matching; and
    (e) judging a word name given to a reference pattern having a maximum pattern similarity among said pattern similarities evaluated for each reference pattern as a recognized result;
    and wherein said step (c) for converting to said local peaks vector comprises the steps of:
    (A) evaluating a speech feature vector Bi by subtracting said noise patter N from each feature vector Ai of an input speech evaluated in each of said speech frame when the speech is inputted after said evaluation of the noise pattern;
    (B) evaluating frame power in each of said speech frame from said speech feature vector Bi and thereby detecting the start point and the end point of the input speech using said frame power;
    (C) evaluating a least square fit line from said speech feature vector Bi in each of said speech frame;

(D) evaluating a spectrum normalized speech feature vector Zi composed of components $Z_i^k$, where i is a subscript indicative of a speech frame number and k is a superscript indicative of the channel number k=1 to K, by spectrum normalizing said speech feature vector Bi using said least square fit line; and (E) evaluating a local peaks vector Ri composed of components $r_i^k$ by making logic "1" components $Z_i^k$ of said spectrum normalized speech feature vector Zi corresponding to channels being the local maximum in a frequency direction to said vector Zi while making logic "0" the other components $Z_i^k$ of said vector Zi, said local maximum being extracted based on the following conditions: $(Z_i^k > Z_i^{k+1})$ and $(Z_i^{k+1})$ and $(Z_i^k > 0)$, where k=1 to K, $Z_i^0 = -\infty$ and $Z_i^{K+1} = -\infty$.

2. A speech recognition method according to claim 1, wherein said local peaks vector conversion step furthermore includes, prior to said step of evaluating the local peaks vector, a step of evaluating a new speech feature vector Ch by making use of linear expansion operation with the air of internal division processing with use of a speech feature vector Bi of an arbitrary speech frame (i) and a speech feature vector $B_{i+1}$ of the next speech frame (i+1) with respect to a speech feature vector from a speech frame of an initial end of an input speech to that of the end point of the same, and setting a speech frames length of a time series of said new speech feature vectors Ch to a prescribed length, said new speech feature vector Ch being employed for evaluating a local peaks vector in the succeeding local peaks vector evaluation step.

3. A speech recognition method according to claim 1, wherein said local peaks vector evaluation step in said local peaks vector conversion step comprises the steps of:

(a) extracting a window vector composed of each binary component yielded by converting each component of said spectrum-normalized speech feature vector to logic "1" if said component is positive and to logic "0" if it is zero or negative;

(b) smoothing said window vector for extracting a smoothed window vector;

(c) evaluating a product of each component of said spectrum-normalized feature vector and each component of said smoothed window vector and thereby extracting it as a windowed feature vector; and (d) judging whether said windowed feature vector has any local maximum in the direction of frequency, and converting said windowed feature vector to a binary local peaks vector which takes components corresponding to channels providing said local maximum, i.e., local peaks as logic "1" and takes the other components as logic "0".

4. A speech recognition method according to claim 2, wherein said local peaks vector evaluation step in said local peaks vector conversion step comprises the steps of:

(a) extracting a window vector composed of binary components yielded by converting each component of said spectrum-normalized speech feature vector to logic "1" if it is positive and to logic "0" if it is zero or negative.

(b) smoothing said window vector for extracting a smoothed window vector;

(c) evaluating a product of each component of said spectrum normalized speech feature vector and each component of said smoothed window vector and thereby extracting it as a windowed feature vector; and (d) judging whether said windowed feature vector has any local maximum in the direction of frequency, and converting said windowed feature vector to binary local peaks vector which takes components corresponding to a channel providing said local maximum.

* * * * *

UNITED STATES PATENT AND TRADEMARK OFFICE
CERTIFICATE OF CORRECTION

PATENT NO. : 4,852,181

DATED : July 25, 1989

INVENTOR(S) : Makoto MORITO; Yukio Tabei; Kozo Yamada

Page 1 of 2

It is certified that error appears in the above-identified patent and that said Letters Patent is hereby corrected as shown below:

Column 2, line 66, change "logic" to -- binary value --;

Column 3, line 1, change "logic" to -- binary value --;
        line 26, change "logic" to -- binary value --;
        line 27, change "logic" to -- binary value --. (both occurrences)

Column 8, line 4, change "logic" to -- binary value --;
        line 8, change "logic" to -- binary value --.

Column 15, line 56, change "logic" to -- binary value --;
        line 57, change "logic" to -- binary value --;
        line 68, change "logic" to -- binary value --.

Column 16, line 3, change "logic" to -- binary value --.

Column 19, line 48, change "logic" to -- binary value --. (both occurrences)

Column 21, line 8, change "logic" to -- binary value --;
        line 12, change "logic" to -- binary value --.

UNITED STATES PATENT AND TRADEMARK OFFICE
CERTIFICATE OF CORRECTION

PATENT NO. : 4,852,181

DATED : July 25, 1989

INVENTOR(S) : Makoto MORITO; Yukio Tabei; Kozo Yamada

It is certified that error appears in the above-identified patent and that said Letters Patent is hereby corrected as shown below:

Column 22, line  1, change "logic" to -- binary value --;
          line  2, change "logic" to -- binary value --;
          line 15, change "logic" to -- binary value --;
          line 16, change "logic" to -- binary value --;
          line 24, change "logic" to -- binary value --. (both occurrences)

Signed and Sealed this

Eleventh Day of December, 1990

*Attest:*

HARRY F. MANBECK, JR.

*Attesting Officer*     *Commissioner of Patents and Trademarks*